Jan. 16, 1968  R. WECHSLER ETAL  3,363,429

TEMPERATURE CONTROL CIRCUIT FOR REFRIGERATION SYSTEM

Filed March 11 1966  3 Sheets-Sheet 1

INVENTORS
Reuben Wechsler
Douglas W. Taylor

BY

ATTYS.

INVENTOR.
Reuben Wechsler
Douglas W. Taylor
BY
ATTY'S.

INVENTORS
Reuben Wechsler
Douglas W. Taylor
BY
ATTY'S.

United States Patent Office 3,363,429
Patented Jan. 16, 1968

3,363,429
TEMPERATURE CONTROL CIRCUIT FOR REFRIGERATION SYSTEM
Reuben Wechsler and Douglas W. Taylor, Phoenix, Ariz., assignors to Motorola, Inc., Franklin Park, Ill., a corporation of Illinois
Filed Mar. 11, 1966, Ser. No. 533,710
14 Claims. (Cl. 62—140)

This invention relates generally to temperature and defrost control systems and more particularly to an electronic defrost and temperature control system which is operable within a refrigeration unit to sense temperature variations and respond to these variations in such a manner that will maintain temperature stability and prevent frost build up within the refrigeration unit.

Various systems are presently available which control frosting and temperature in refrigeration units, heat pumps, and the like. These systems include electromechanical apparatus capable of initiating defrost cycles and maintaining temperature control on a fixed time basis or in response to other factors not directly related to the undesirable temperature changes and frost build up that a system is designed to eliminate. These systems are generally not as efficient as a temperature and defrost control system having a cyclic operation which is directly dependent upon the changing conditions for which the system is designed to compensate.

Other presently known systems having transducers which are directly responsive to a changing condition such as temperature which is to be stabilized within certain limits employ mechanical or electromechanical sensors which are actuated in response to changes in temperature, frosting, etc., to effect a subsequent defrosting or temperature compensating action. However, the use of mechanically actuated sensors such as expandable bellows or other devices which change in size or position with a change in frost build up and temperature are not normally as reliable and accurate as systems which are wholly electronic in nature.

Accordingly, it is an object of this invention to provide a new and improved electronic control system which responds directly to undesirable changes in temperature and frosting within a refrigeration unit to compensate for same.

It is another object of this invention to provide a new and improved, totally electronic temperature control circuit adapted to be operated in a refrigeration unit or other similar apparatus to maintain precision temperature control therein.

It is another object of this invention to provide a novel electronic defrost control system adapted to be operated in the freezer compartment of a refrigeration unit or other similar apparatus and capable of maintaining a frost-free condition within this compartment.

It is another object of this invention to provide highly accurate electronic control circuits for maintaining temperature stability and a frost-free condition within a refrigeration unit in direct response to frost build up and temperature changes within the unit.

It is a further object of the invention to provide new and improved, wholly electronic refrigeration control circuits which require no mechanical transducers.

It is still a further object of this invention to provide a control system of the type described including temperature sensors which may be easily relocated within the system if it desired to change the physical location of the control system within any particular refrigeration unit.

A feature of this invention is the provision of a temperature and defrost control system including at least one electrical transducer which is responsive to an undesirable change in temperature for producing an initial corresponding change in voltage within the system. The system further includes an electronic circuit responsive to this initial voltage change for energizing a load and electrical switching circuitry connected between the electronic circuit and the load for producing a change in voltage at the electronic circuit sufficient to maintain the electronic circuit and load energized until the transducer becomes subsequently subjected to another, compensating temperature change. This compensating temperature change will produce another offsetting voltage change at the transducer which is at least equal and opposite to the initial voltage change. This offsetting voltage change will de-energize the electronic circuit and the load.

Another feature of the invention is the provision of a controlled rectifier operable to be energized by the electronic circuit mentioned above for effecting the energization of a compressor or other like apparatus which will produce the final, temperature induced voltage change at the electronic circuit, referred to above as the offsetting voltage change.

Another feature of the invention is a provision of a plurality of electrical transducers positionable at various locations within the freezer chest and provision compartment of a refrigeration unit and sensitive to various temperature changes and frosting conditions therein to provide positive control for the aforementioned electronic circuit. This electronic circuit is operable to initiate temperature and frost compensating action in a number of ways, among which include the on-off control of a compressor for maintaining a desirable temperature stability within the unit and the on-off control of a heating element to provide frost-free conditions in the freezer compartment of the refrigeration unit.

These and other objects and features will be apparent in the following description of the accompanying drawings wherein.

Briefly described, the control system according to the present invention includes one or more transducers positionable at one or more locations, respectively, in the freezer and provision compartments of a refrigeration unit. These transducers are responsive to undesirable frost and temperature conditions within these two compartments to effect a temperature compensating change necessary to maintain temperature stability in the refrigeration unit and frost-free conditions in the freezer compartment thereof. The temperature control system of the invention includes a thermistor positionable within the provision compartment of the refrigeration unit and responsive to an undesirable increase in provision compartment temperature to energize an electronic control circuit. This electronic circuit will, in turn, cause a compressor to be energized, and this compressor will run for a period of time to be determined by certain component values in the electronic circuit. After a predetermined period of time, the thermistor will have been subjected to a temperature change (increase) equal and opposite to the temperature change which originally provided the energization for the electronic circuit, and the electronic circuit (and compressor) will be de-energized until the provision compartment temperature again rises to an undesirable level.

The defrost control system according to the invention includes a plurality of transducers mountable at various locations within the freezer compartment of a refrigeration unit and responsive to temperature changes at these various locations to control the energization of an electronic circuit similar to the electronic circuit included in the temperature control system referred to above. This electronic circuit is operable to energize a heating element or other similar device which will provide a defrosting of the freezer compartment for a period of time which is also determined by the values of various components within the electronic circuit. At the end of this period of time, the electronic circuit and the heater element are de-energized until the frost in the freezer compartment again builds up by a given amount. It is possible and sometimes desirable to use the hot gases from the compressor as a means for defrosting the freezer compartment of the refrigeration unit. If this is done, a separate defrost heater element is not required.

Figure 1:
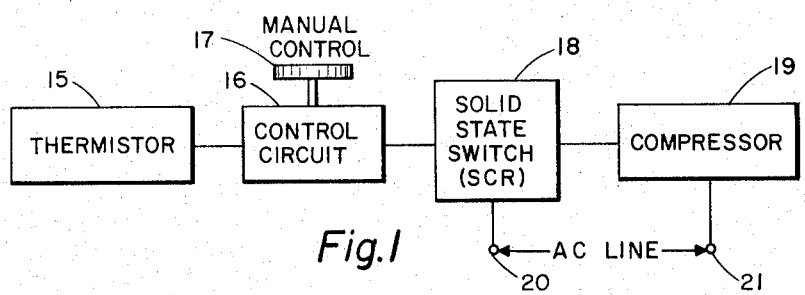
FIG. 1 is a block diagram of the provision compartment temperature control system according to the present invention.

Referring in detail to the drawings, there is shown in the block diagram of FIG. 1 a control circuit 16 to which is connected a thermistor 15 or other like temperature sening device and a manual control element 17 for adjusting the response of the control circuit 16 to temperature changes at thermistor 15. As will be seen in FIG. 2, this response adjustment may be a potentiometer or other like voltage level setting device which can be adjusted to vary the amount of resistance change in the thermistor 15 necessary for energizing the control circuit 16. A solid state switch 18 is connected to the output of the control circuit 16 and is adapted to be energized by the control circuit 16. With switch 18 conducting, an AC energizing voltage at terminals 20 and 21 is applied to compressor 19. The compressor 19 will remain on until the temperature at thermistor 15 has been lowered to a desired value and until the resistance of thermistor 15 has been increased to a value sufficient to cause the control circuit 16 to be turned off and the switch 18 and compressor 19 to be de-energized.

Figure 2:
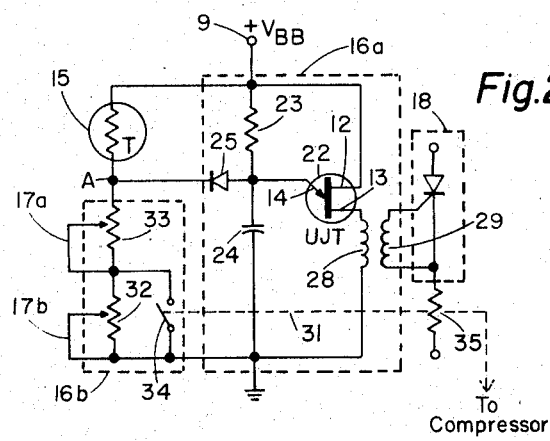
FIG. 2 is a schematic diagram of FIG. 1.

The embodiment of FIG. 2 illustrates schematically how the thermistor 15 may be connected to the control circuit 16 in such a manner that it will be operable to control the on and off times of the compressor 19. The control circuit represented at 16 in FIG. 1 is divided in FIG. 2 into a first section 16a including an electronic unijunction transistor (UJT) oscillator circuit and a second section 16b connected between the oscillator circuit (at point A) and a load 35. Current flowing in load resistor 35 exerts positive control of the UJT oscillator circuit for enabling the compressor 19 to be energized for a time sufficient to effect a desired temperature change in a refrigerator provision compartment in which the schematic circuit of FIG. 2 is located.

The electronic circuit in section 16a includes a unijunction transistor 22 having its emitter 14 connected via resistor 23 to a point 9 of positive potential $V_{BB}$ and connected through a capacitor 24 to a point of reference or ground potential. One electrode 13 of the two base electrodes of unijunction transistor 22 is coupled to the input winding 28 of a transformer coupling arrangement, and a diode 25 is connected between the emitter 14 and a thermistor 15 which provides a varying control voltage at the UJT oscillator in section 16a. The UJT oscillator in section 16a is well known in the art and its operation involves the continuous charging of capacitor 24 through resistor 23 and discharging through the emitter base junction of unijunction transistor 22 in order to periodically bias the unijunction transistor 22 into conduction and provide a time-varying current in winding 28. The UJT oscillator, however, must have a frequency of oscillation much higher than the AC line frequency in order that an oscillator output pulse is available at each half cycle of the line frequency. Current flowing in winding 28 causes a voltage to be induced in winding 29 sufficient to energize the silicon controlled rectifier 18 and cause current to flow in a load resistor 35.

Thermistor 15 is connected between voltage supply $V_{BB}$ and point A, and a variable potentiometer arrangement including resistors 32 and 33 in section 16b of the control circuit 16 is connected between point A and ground potential. An electronic switch 34 is connected in shunt with resistor 32 and is electrically coupled by means 31 to the load resistor 35 so that current flowing in the load 35 will open the switch 34 and produce a step change in voltage at point A proportional to the value of resistor 32.

The operation of the circuit in FIG. 2 may be explained as follows. Assume that the circuit of FIG. 2 is located in the provision compartment of a refrigeration unit and that the thermistor 15 is subjected to variations of temperature within the provision compartment. Assume also that initially the temperature within the provision compartment is at a desired level for cooling the contents therein and that the diode 25 is conducting and unijunction transistor 22 is non-conducting. With the compressor 19 that cools the provision compartment de-energized, the temperature in the provision compartment will, after some time, begin to increase. Since the thermistor 15 has a negative temperature coefficient of resistance, the resistance of thermistor 15 will decrease and the voltage at point A will be raised accordingly. The voltage at point A will be raised accordingly. The voltage at point A will continue to rise until diode 25 becomes reversed biased. With diode 25 reversed biased, capacitor 24 will begin to charge until the unijunction transistor 22 is triggered and oscillations in the UJT oscillator are initiated. With the UJT oscillator circuit including unijunction transistor 22 conducting, the SCR 18 will fire and current will flow in load resistor 35, opening switch 34. When switch 34 is opened the resistor 32 is instantaneously connected in the section 16b of control circuit 16, and a step increase in voltage at point A is produced. This step increase in voltage at point A adds to the increase in voltage produced by the decrease in resistance of thermistor 15, and the UJT oscillator in section 16a will continue to oscillate until the thermistor 15 undergoes another resistance change (increase) necessary to again lower the voltage at point A to a value sufficient to forward bias diode 25 and turn off the UJT oscillator.

The change in temperature required to vary the resistance of thermistor by an amount sufficient to bias unijunction transistor 22 conducting may be varied by changing the variable potentiometer setting 17a and 17b, and the cooling within the provision compartment is provided by the energization of a compressor 19 (not shown in FIG. 2) simultaneously with the energization of the UJT oscillator.

Figure 3:
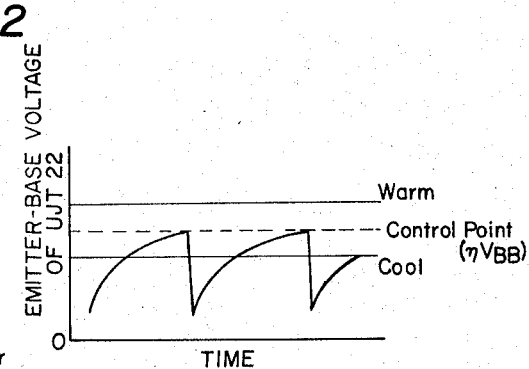
FIG. 3 is a waveform diagram of the unijunction transistor 22 emitter-base voltage versus time.

FIG. 3 is a graph of emitter base voltage of unijunction transistor 22 versus time.

In order for the UJT oscillator in section 16a of FIG. 2 to fire and generate a pulse, the emitter 14 of unijunction transistor 22 must reach a voltage approximately equal to $\eta V_{BB}$, where $\eta$ is the intrinsic stand-off ratio of the unijunction transistor 22. If the voltage at point A is less than $\eta V_{BB}$, diode 25 is forward biased and the UJT oscillator is clamped off. With the diode 25 reverse biased and the UJT oscillator circuit oscillating, the emitter-base voltage of transistor 22 will vary with time as shown in FIG. 3. The transistor 22 conducts each time capacitor 24 charges to a maximum voltage and the emitter-base voltage at 22 reaches $\eta V_{BB}$.

Figure 4:
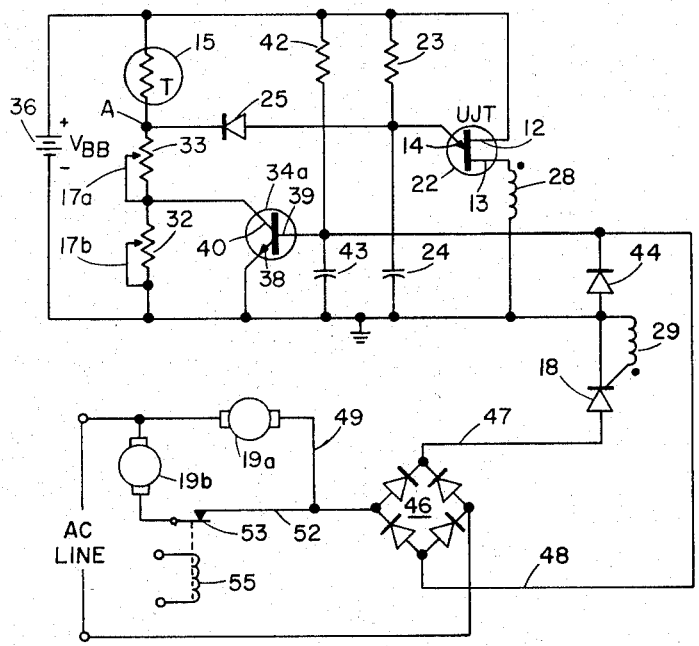
FIG. 4 is another schematic diagram of FIG. 1 including additional compressor control circuitry.

The circuit of FIG. 4 is a further extension of the circuit of FIG. 2, and the same reference numerals have been used in FIGS. 2 and 4 to designate corresponding components. Included in the circuit of FIG. 4 and not shown in FIG. 2 is a transistor 34a connected in shunt with resistor 32. Transistor 34a includes emitter-base and collector electrodes 38, 39 and 40 and the base electrode 39 is connected via resistor 42 to the positive terminal of battery 36 and via a filter capacitor 43 to ground. A diode 44 is connected in parallel with the emitter-base junction of transistor 34a for insuring non-conduction of transistor 34a when the compressor 19 is energized.

A compressor including parallel connected compressor and fan motors 19a and 19b respectively, is connected in series in an AC line, and a full wave diode bridge 46 interconnects the compressor motors 19a and 19b to the silicon controlled rectifier (SCR) 18. Once the UJT oscillator is energized and the current flowing in winding 28 induces a triggering voltage in winding 29, the SCR 18 is fired and a path of alternating current for compressor 19 is provided through lines 47 and 48, and 49. When SCR 18 is triggered and the compressor motor 19a and fan motor 19b are energized by an alternating voltage on lines 47, 48 and 49, the voltage drop across diode 44 reverse biases transistor 34a and turns off the previously conducting transistor 34a. Thus, transistor 34a provides the switching function which is provided by switch 34 in FIG. 2. When transistor 34a turns off, the resistor 32 is instantaneously connected in the circuit of FIG. 4 to produce a step change in voltage point A in a manner similar to that described with reference to FIG. 2.

The compressor and fan motors 19a and 19b will continue to run and cool the provision compartment of a refrigeration unit (not shown) until the temperature therein has dropped sufficiently to increase the resistance of thermistor 15 and again forward bias diode 25, turning off the UJT oscillator.

Figure 5:
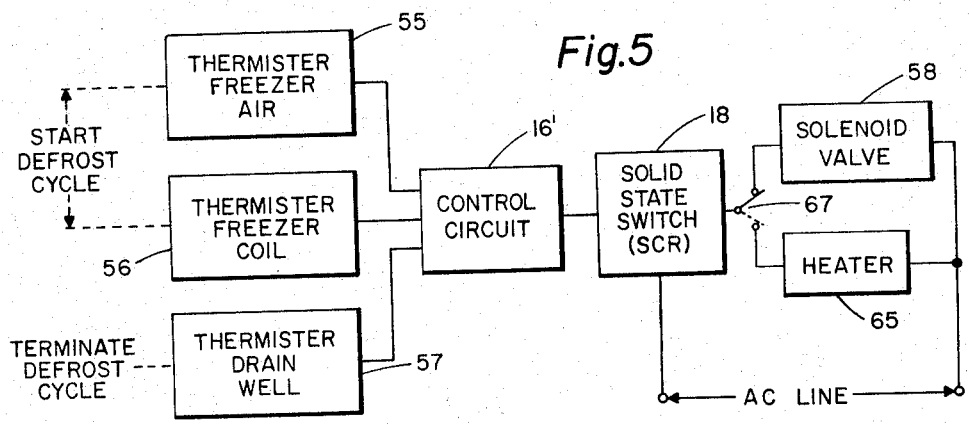
FIG. 5 is a block diagram of a refrigerator freezer compartment defrost control system according to the present invention.
Figure 6:
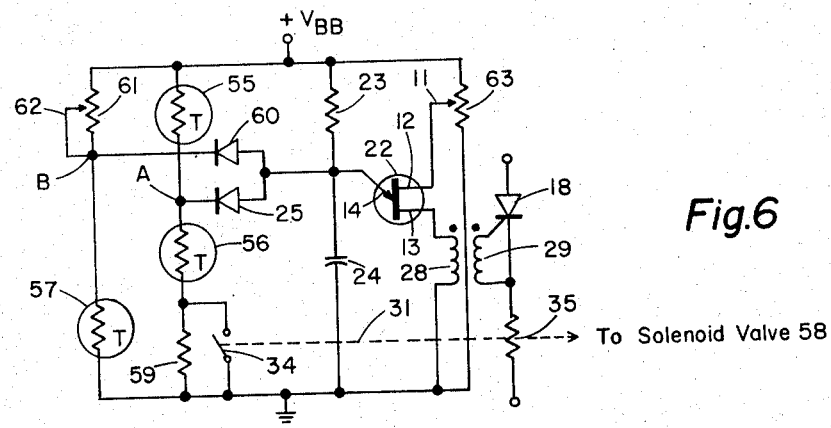
FIG. 6 is a schematic diagram of a portion of FIG. 5.
Figure 7:
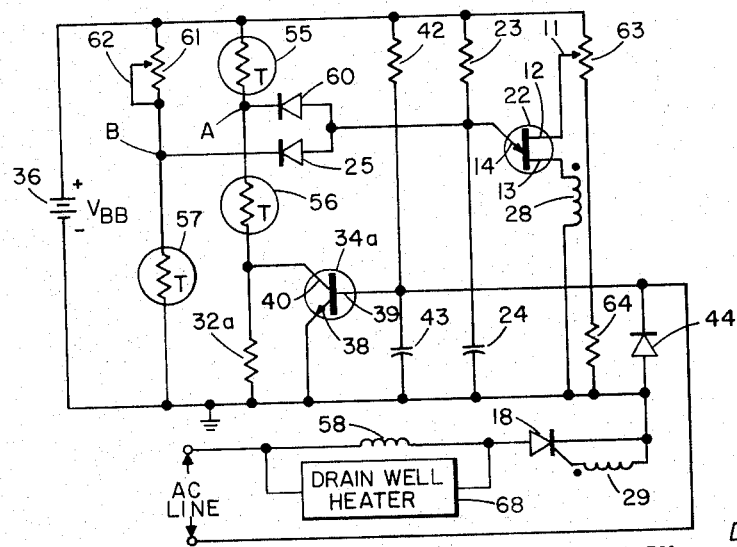
FIG. 7 is another schematic diagram of the system shown in FIG. 5, including additional defrost control circuitry.

The defrost control system according to the invention is represented by FIGS. 5, 6 and 7, and this system includes a plurality of thermistors 55, 56 and 57 positionable at variable locations within the freezer compartment of a refrigeration unit. In the embodiments illustrated in FIGS. 5, 6 and 7, a first thermistor 55 is positionable anywhere within the open space of the freezer compartment, a second thermistor 56 is positionable in intimate contact with the freezer or evaporator coils in the freezer compartment and a third thermistor 57 is located in the drain well of the freezer compartment. Each of these thermistors 55, 56 and 57 provides a separate control signal at the input of control circuit 16', and the control circuit 16' determines the conductive state of the SCR 18 in a manner similar to that described with reference to FIGS. 2 and 4. When the SCR 18 in FIGS. 5, 6 and 7 is energized, current will either flow in solenoid valve 58 or in a heater element 65, depending upon the position of switch 67. With the solenoid valve 58 energized, hot gases from the compressor 19 are allowed to enter the freezer compartment to begin the defrost cycle. The compressor 19 is not shown in FIGS. 5, 6 and 7, but solenoid valve 58 may be conveniently built into compressor 19 to control the flow of hot gases therefrom.

An alternate method of defrosting the freezer compartment would be to switch an electric defrost heater 65 in the AC line in FIG. 5 when the SCR18 is energized. This may be accomplished by changing the position of switch 67.

The thermistor 55 in FIG. 6 may be positioned within the air space of the freezer compartment in a manner similar to the positioning of the thermistor 15 (FIGS. 2 and 4) in the air space of the provision compartment of the refrigeration unit. As the frost builds up in the refrigeration freezer compartment and the heat transfer to the freezer coils is decreased, the temperature of the air in the freezer compartment will increase just as the temperature of the air in the provision compartment increases after the compressor has been turned off. Thus, the resistance of thermistor 55 will decrease with frost build-up, tending to reverse bias diode 25 in FIG. 6.

A second thermistor 56 is mountable in intimate contact with the freezer or evaporator coils in the freezer compartment. As the frost builds up on these coils (not shown) and the heat absorbed by the refrigerant in these coils is decreased, the coils get increasingly colder, causing the resistance of thermistor 56 to increase. An increase in the resistance of thermistor 56 also tends to reverse bias diode 25, and the voltage change produced at point A by the changes in resistance of thermistors 55 and 56 is unidirectional.

As will be explained in a further description of FIG. 6, the voltage at point B will be sufficiently high (diode 60 reverse biased) during frost build-up so that once the diode 25 is reversed biased, the unijunction transistor 22 will conduct and fire the SCR18 to initiate current flow in the load resistor 35. Once current begins to flow in the load resistor 35, electrical means 31 responds thereto and opens switch 34, connecting resistor 59 between point A and ground potential. When resistor 59 is effectively connected in the circuit of FIG. 6, a step change in voltage is produced at point A similar to that described with reference to FIGS. 2 and 4.

The step change in voltage produced at point A will maintain the diode 25 reversed biased until the heater element 65 or solenoid valve 58 has been energized for a time sufficient to defrost the freezer coils upon which thermistor 56 is mounted. Furthering defrosting of the freezer coils, the thermistors 55 and 56 undergo resistance changes in opposite directions with each change contributing to a unidirectional voltage decrease at point A. The heater element 65 (not shown in FIGS. 5 and 6) or solenoid valve 58 may be coupled by any convenient means to the SCR18 or the load resistor 35 as long as the heater element or solenoid valve 58 is energized simultaneously with the firing of the UJT oscillator.

A third thermistor 57 is positionable in the drain of the freezer compartment in the refrigeration unit (not shown) and the drain provides an outlet for the flow of water from the freezer compartment once the frost on the freezer coils begins to melt. Therefore, during frost build-up when there is no flow of water through the drain, the resistance of the third thermistor 57 is high, preventing the voltage at point B from dropping to a value sufficiently low to reverse bias diode 60. However, once defrosting of the freezer coils begins the drain well heater 68 (FIG. 7) is also energized to defrost an outlet aperture in the freezer compartment to allow excess water in the freezer compartment to pass to the freezer compartment drain well. This will increase the drain well temperature and produce a corresponding decrease in resistance of thermistor 57. The change in resistance of thermistor 57 will continue to decrease until the voltage at point B is sufficiently low to forward bias diode 60 and clamp the UJT oscillator off. The amount of resistance change in thermistor 57 necessary to forward bias diode 60 will be dependent upon the position of the potentiometer arm 62 on resistor 61.

FIG. 6 has the additional feature of a variable bias resistor 63 to which is connected the base electrode 12 of the unijunction transistor 22. The potentiometer arm 11 of resistor 63 may be varied in order to change the emitter-base voltage at which the unijunction transistor 22 will conduct.

The circuit shown in FIG. 7 is an extension of the circuit in FIG. 6. It includes, in addition to a solenoid coil 58 and drain well heater 68 referred to above, a transistor 34a is connected as a switch in shunt with resistor 32a in a circuit configuration identical to that shown in FIG. 4. The diode 44 and capacitor 43 maintain the transistor 34a non-conducting once the unijunction transistor 22 fires and the UJT oscillator begins oscillating.

The thermistors 55, 56 and 57 are connected in a circuit configuration identical to that shown in FIG. 6, and once a circuit is completed through SCR18 and diode 44 to provide an AC energizing current through solenoid valve 58, defrosting will begin. Drain well heater 68 will also be energized to gradually increase the drain well temperature and eventually cause the UJT oscillator to be turned off.

Figure 8:
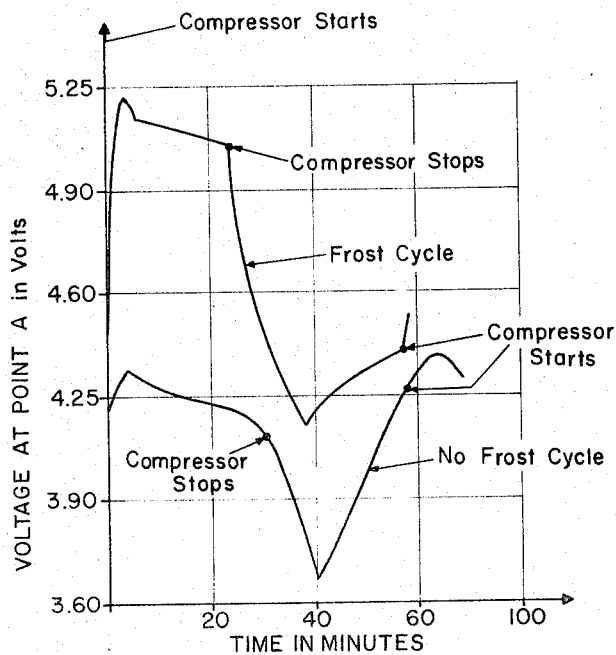
FIG. 8 is a graph of voltage at point A in FIG. 7 versus time for compressor cycles with frost and no frost conditions in the refrigerator freezer compartment.

FIG. 8 is a graph of the voltage at point A in FIGS. 6 and 7 for the on-off compressor cycles under frost and no-frost conditions in the freezer compartment of a refrigeration unit. The upper curve in FIG. 8 is a time variation in voltage at point A when there is frost on the evaporator coils in the freezer compartment, and the lower curve in FIG. 8 is a time variation in voltage at point A when there is no frost on the evaporator coils. In both curves shown in FIG. 8, there is an initial rise in voltage at point A due to the cooling of the evaporator coils at a rate greater than the cooling of the air in the freezer compartment. This initial peaking in the two curves is caused by an increase in the resistance of thermistor 56 at a rate greater than the increase of resistance in thermistor 55. However, after the initial peaking of the two curves which is indicated in the time vicinity of approximately five minutes, the temperature of the air in the freezer compartment begins to decrease at a faster rate than the decrease in temperature of the freezer coils. This is true even for a time after the compressor has shut down, and this causes the voltage at point A to drop until reaching a minimum point in the vicinity of 40 minutes. At approximately this time, for the particular refrigeration unit tested, the air temperature begins to increase for both frost and no-frost conditions, and the voltage at point A is again increased, until the UJT oscillator is biased into oscillation and the compressor 19 turned on.

When there is frost on the coils the resistance of thermistor 56 is higher and resistance of thermistor 55 is lower than the values recorded for the no-frost cycle. This causes the voltage at point A to remain considerably higher than the voltage at point A in the no-frost cycle. However, the excursions of the two curves shown in FIG. 8 exhibit similar time variations over the on-off compressor cycle. An important feature to be observed in the voltage-time curves of FIG. 8 is that the peak in voltage at point A occurs after the time when the compressor is turned on.

When there is frost on the coils the resistance of thermistor 56 is higher and resistance of thermistor 55 is lower than the values recorded for the no-frost cycle. This causes the voltage at point A to remain considerably higher than the voltage at point A in the no-frost cycle. However, the excursions of the two curves shown in FIG. 8 exhibit similar time variations over the on-off compressor cycle. An important feature to be observed in the voltage-time curves of FIG. 8 is that the peak in voltage at point A occurs after the time when the compressor is turned on. This enables the circuits in FIGS. 6 and 7 to maintain the oscillator therein conducting for a time sufficient to enable the compressor to bring the freezer compartment temperature back down to a desired level when the compressor hot gas defrost is used.

Figure 9:
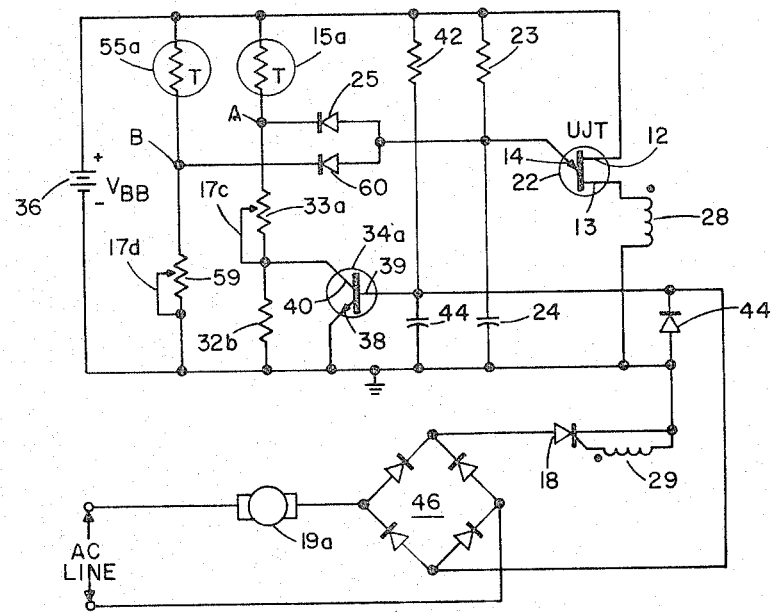
FIG. 9 is a schematic diagram of an alternative circuit connection which may be used for controlling the temperature in the provision compartment of a refrigeration unit.

The circuit in FIG. 9 is a refrigeration unit provision compartment temperature control circuit which allows the cooling element in the provision compartment to govern turn-on of the compressor and allows the air temperature within the provision compartment to govern compressor turn-off. This circuit of FIG. 9 is quite similar to the circuit of FIG. 4, and includes a first thermistor 15a positionable adjacent to the cooling element within the provision compartment and a second thermistor 55a positionable in the air space within the provision compartment. Consider the situation where the compressor motor 19a has been turned off and the temperature within the provision compartment has been lowered to a desired level. In this situation, the resistance of thermistor 55a has been increased to a value sufficient to drop the voltage at point B and allow diode 60 to conduct, turning off the UJT oscillator. After a given time, during which the compressor has not been running, the air within the provision compartment becomes warmer and the resistance of thermistors 15a and 55a begin to decrease. As the resistance of thermistor 55a decreases, point B becomes raised in voltage to a value sufficient to back bias diode 60. At the same time, the resistance of thermistor 15a decreases, allowing the voltage at point A to increase until diode 25 is reverse biased and the unijunction transistor 22 is fired. This causes the SCR18 to be triggered and the AC path for the compressor motor 19a is completed through the full wave diode bridge 46.

Since both thermistors 15a and 55a undergo like changes in resistance with increasing and decreasing temperatures within the provision compartment, either of these thermistors can be for controlling the cut-in and cut-out temperature for the compressor. This may be done by adjusting the arms 17c and 17d of the potentiometers 33a and 59, respectively.

The circuit of FIG. 9 operates similar to the circuit of FIG. 4, and transistor 34a becomes reverse biased upon the conduction of the UJT oscillator and enables resistor 32b to be connected between point A and ground potential.

It should be understood that the thermistors shown in the above-described embodiments may be relocated at various different places within a refrigeration or similar unit without departing from the scope of this invention. The above-described locations are merely exemplary of some possible locations within a refrigeration or like unit which undergo unlike temperature changes with increasing and decreasing temperature and frosting in the unit. The operation of the various circuits described above takes advantage of these unlike temperature changes to provide positive control for both temperature and frosting within a refrigeration unit.

It should also be understood that the various thermistors in the above-described circuits could be replaced with other temperature sensors or replaced with thermistors having positive temperature coefficients of resistance without departing from the scope of the invention as set forth in the following appended claims.

We claim:
1. A temperature control circuit including in combination:
 (a) transducer means responsive to a change in temperature for producing a corresponding first change in voltage;
 (b) electronic circuit means responsive to said first voltage change for energizing a load; and
 (c) means connected between said electronic circuit means and said load for producing a second change in voltage at said electronic circuit means aiding said first voltage change and sufficient to maintain said electronic circuit means conducting and sufficient to maintain said load energized until said transducer means produces a third voltage change at said electronic circuit means which will counteract said first and second voltage changes and de-energize said electronic circuit means.

2. The circuit according to claim 1 wherein said second voltage change producing means includes:
 (a) impedance means connected to a point of reference potential; and
 (b) means connected between said impedance means and said load and responsive to current flowing in said load for effectively connecting said impedance means between said point of reference potential and said electronic circuit means thereby producing a step change in voltage at said electronic circuit means.

3. The circuit according to claim 2 wherein said electronic circuit means includes:

(a) oscillator means biased inoperative in the absence of said temperature change and biased operative by said first voltage change corresponding to said temperature change to initiate current flow in said load, and said means for effectively connecting includes;
(b) switching means connected in parallel with said impedance means, and
(c) control means connected between said load and said switching means and responsive to load current for removing the parallel connection between said switching means and said impedance means.

4. The circuit according to claim 3 wherein said second voltage change producing means further includes:
(a) controlled rectifier means coupled between said electronic circuit means and said switching means, said controlled rectifier means operable to be energized upon the energization of said oscillator means, and
(b) said switching means responsive to the energization of said control rectifier means for effectively connecting said impedance means to said electronic circuit means, said circuit further including,
(c) means connected to said control means for energizing a cooling means for decreasing the temperature at said transducer means and inducing said third voltage change at said electronic circuit means.

5. The circuit according to claim 3 wherein said second voltage change producing means is further connected to a means for causing another compensating temperature change in the areas surrounding said transducer means which will cause said third voltage change to occur and will cause said electronic circuit means to be de-energized.

6. The circuit according to claim 5 wherein said transducer means includes:
(a) a first temperature sensor connected to a source of unidirectional exciting potential and positionable adjacent to a cooling element in the provision compartment of a refrigeration unit;
(b) a second temperature sensor connected to said source of unidirectional exciting potential and positionable within the air space of the provision compartment of said refrigeration unit, said electronic circuit means including;
(c) a first diode means connected to said first temperature sensor; and
(d) a second diode means connected to said second temperature sensor, and said first and second diodes having their conductive states controlled by temperature induced voltage changes at said first and second temperature sensors to control the conducting state of said electronic circuit means.

7. A defrost control circuit responsive to temperature changes caused by increased frosting in a refrigeration freezer compartment for energizing means for defrosting said compartment, said circuit comprising:
(a) a first transducer means adapted to be mounted at a first location within said compartment, the temperature of said first location being increased as frosting in said compartment is increased, said first transducer means responsive to a change in temperature at said first location for producing an initial voltage change proportional thereto;
(b) a second transducer means mountable at a second location within said freezer compartment, the temperature at said second location being decreased as said frosting is increased, said first and second transducer means producing initial mutually aiding unidirectional voltage changes at a common junction therebetween while undergoing opposite changes in resistance with the temperature changes at said first and second locations in said freezer compartment respectively;
(c) electronic circuit means connected to said common junction between said first and second transducer means and responsive to said unidirectional voltage changes for energizing a load; and
(d) means connected between said electronic circuit means and said load for producing a change in voltage at said electronic circuit means sufficient to maintain said electronic circuit means conducting and sufficient to maintain said load energized until said first and second transducer means produce further temperature induced voltage changes at said electronic circuit means which are at least equal in magnitude and opposite in direction to said initial unidirectional voltage changes in order to de-energize said electronic circuit means.

8. The circuit according to claim 7 wherein said voltage change producing means includes:
(a) first impedance means connected to a point of reference potential; and
(b) means connected between said impedance means and said load and responsive to current flowing in said load for effectively connecting said impedance means to said electronic circuit means and thereby producing a step change in voltage at said electronic circuit means.

9. The circuit according to claim 8 which further includes:
(a) a third transducer means adapted to be mounted at a third location within said freezer compartment, the temperature at said third location being increased as said frosting is decreased, said third transducer means connected between a point of reference potential and said electronic circuit means for producing a temperature induced voltage change at said electronic circuit means for rendering said electronic circuit means non-conducting; and
(b) second impedance means connected between said third transducer means and a voltage supply terminal.

10. A frost control circuit responsive to temperature changes at the evaporator coils, and air space adjacent the evaporator coils, and a drain, all within a freezer compartment of a refrigeration unit, said temperature changes produced by an increased frosting and defrosting within said compartment and causing said defrost control circuit to respond to increased frosting in said unit for defrosting said unit, said temperature control circuit comprising:
(a) a first transducer means mountable in the air space of said compartment and connected to a source of supply voltage, said first transducer means responsive to a change in air space temperature for producing an initial voltage change proportional thereto;
(b) a second transducer means connected between said first transducer means and a point of reference potential, said second transducer means mountable in intimate contact with said evaporator coils in said freezer compartment and adapted to simultaneously undergo a resistance change opposite in direction to said resistance change in said first transducer means, said first and second transducer means connected at a common junction and forming a voltage divider network, the voltage changes produced by the resistance variations in said first and second transducer means being mutually aiding and producing a composite unidirectional voltage change;
(c) an oscillator means biased normally inoperative;
(d) a first diode means connected between said oscillator means and said common junction of said voltage divider network, said first diode means being clamped by the voltage at said voltage divider network when said oscillator means is inoperative and being unclamped by said composite unidirectional voltage change produced by resistance variations in said first and second transducer means and caused by temperature changes in the evaporator coils and the air space adjacent the evaporator coils during increased frosting in said refrigeration unit; and (e) means including a load connected between said oscillator means and said first diode means for producing a further voltage change at said first diode means which adds to said composite unidirectional voltage change and which tends to maintain said oscillator means biased operative.

11. The circuit according to claim 10 wherein said further voltage change producing means includes:
(a) first impedance means connected to said point of reference potential;
(b) switching means connected in parallel with said first impedance means; and
(c) control means connected between said load and said switching means and responsive to load current for connecting said first impedance means to said second transducer means and thereby producing a step change in voltage at said first diode means for unclamping said first diode means.

12. The circuit according to claim 11 wherein said switching means includes:
(a) transistor means connected in parallel with said first impedance means, and said control means includes;
(b) a bias network means connected between said transistor means and said load for reverse biasing said transistor means when said oscillator means is operative and current is flowing in said load; and
(c) means interconnecting said load with a heating means for energizing said heating means and thereby causing defrosting in said freezer compartment.

13. The circuit according to claim 11 which further includes:
(a) a second diode means connected to said oscillator means;
(b) a second impedance means connected between said second diode means and said supply voltage; and
(c) a third transducer means connected between said junction of said second diode means in said second impedance means and a point of reference potential, said third transducer means mountable in the drain of said freezer compartment and producing a re-clamping voltage at said second diode means for de-energizing said oscillator means when said freezer compartment is sufficiently defrosted and said third transducer means has undergone a predetermined temperature-induced resistance change.

14. The circuit according to claim 13 wherein said control means includes means for energizing a heating means within said refrigeration unit for defrosting said freezer compartment when said oscillator means is operative.

No references cited.

MEYER PERLIN, *Primary Examiner.*